(12) United States Patent
Habraken et al.

(10) Patent No.: US 10,583,595 B2
(45) Date of Patent: Mar. 10, 2020

(54) METHOD FOR PRODUCING A COMPOSITE PLASTIC PART (CK)

(71) Applicant: BASF SE, Ludwigshafen (DE)

(72) Inventors: Gijsbrecht Habraken, Budd Lake, NJ (US); Manoranjan Prusty, Mannheim (DE); Andreas Radtke, Mannheim (DE); Gaurav Ramanlal Kasaliwal, Mannheim (DE)

(73) Assignee: BASF SE, Ludwigshafen am Rhein (DE)

( * ) Notice: Subject to any disclaimer, the term of this patent is extended or adjusted under 35 U.S.C. 154(b) by 618 days.

(21) Appl. No.: 14/913,114

(22) PCT Filed: Aug. 18, 2014

(86) PCT No.: PCT/EP2014/067589
§ 371 (c)(1),
(2) Date: Feb. 19, 2016

(87) PCT Pub. No.: WO2015/024913
PCT Pub. Date: Feb. 26, 2015

(65) Prior Publication Data
US 2016/0207238 A1    Jul. 21, 2016

(30) Foreign Application Priority Data
Aug. 21, 2013   (EP) .................................. 13181152

(51) Int. Cl.
| | |
|---|---|
| B29C 45/14 | (2006.01) |
| C08J 5/10 | (2006.01) |
| C08L 77/00 | (2006.01) |
| C08L 79/02 | (2006.01) |
| B29C 70/08 | (2006.01) |
| B29C 45/16 | (2006.01) |
| B29K 77/00 | (2006.01) |
| B29K 79/00 | (2006.01) |
| B29K 105/12 | (2006.01) |

(52) U.S. Cl.
CPC ........... *B29C 45/14786* (2013.01); *C08J 5/10* (2013.01); *C08L 77/00* (2013.01); *C08L 79/02* (2013.01); *B29C 45/14311* (2013.01); *B29C 45/1671* (2013.01); *B29C 70/081* (2013.01); *B29K 2077/00* (2013.01); *B29K 2079/085* (2013.01); *B29K 2105/12* (2013.01); *C08J 2377/00* (2013.01); *C08J 2479/02* (2013.01)

(58) Field of Classification Search
CPC ...... C08J 5/10; B29C 45/14786; C08L 77/00; C08L 79/02
USPC ......................................................... 264/257
See application file for complete search history.

(56) References Cited

U.S. PATENT DOCUMENTS

| | | | |
|---|---|---|---|
| 4,144,123 A | 3/1979 | Scharf et al. | |
| 4,371,674 A | 2/1983 | Hertel et al. | |
| 4,537,949 A | 8/1985 | Schmidt et al. | |
| 4,540,772 A | 9/1985 | Pipper et al. | |
| 5,536,370 A | 7/1996 | Scherr et al. | |
| 5,641,855 A | 6/1997 | Scherr et al. | |
| 6,063,286 A | 5/2000 | Steuerle et al. | |
| 6,407,182 B1* | 6/2002 | Maul | C08L 77/00 525/432 |
| 8,268,920 B2 | 9/2012 | Prusty et al. | |
| 9,139,752 B2 | 9/2015 | Desbois et al. | |
| 9,475,265 B2 | 10/2016 | Elia et al. | |
| 2003/0176538 A1 | 9/2003 | Wu et al. | |
| 2008/0176090 A1 | 7/2008 | Elia et al. | |
| 2008/0262133 A1* | 10/2008 | Eibeck | C08L 77/00 524/186 |
| 2012/0027983 A1* | 2/2012 | Elia | B29C 45/14631 428/74 |
| 2012/0108129 A1* | 5/2012 | Elia | B32B 5/024 442/136 |
| 2012/0149817 A1 | 6/2012 | Eibeck et al. | |
| 2013/0065466 A1 | 3/2013 | Desbois et al. | |

(Continued)

FOREIGN PATENT DOCUMENTS

| | | |
|---|---|---|
| CN | 101115786 A | 1/2008 |
| CN | 103328203 A | 9/2013 |

(Continued)

OTHER PUBLICATIONS

Park et al. ("Characterization of Branched Polyethyleneimine by Laser Light Scattering and Viscometry", Polymer vol. 37 No. 2, pp. 313-319, 1999 (Year: 1999).*

(Continued)

*Primary Examiner* — Joseph S Del Sole
*Assistant Examiner* — Lawrence D. Hohenbrink, Jr.
(74) *Attorney, Agent, or Firm* — Drinker Biddle & Reath LLP

(57) ABSTRACT

The invention relates to a method for producing a composite plastic part (CK). A first fiber material (F1) is impregnated with a polyamide matrix polymer (PAM), thereby obtaining a matrix composition (MZ), onto which a surface composition (OZ) is applied, and a first plastic component (K1) is obtained. In a second step, a second plastic component (K2) is molded on the first plastic component (K1), whereby the composite plastic part (CK) is obtained. The invention further relates to the composite plastic part (CK) which can be obtained using the method according to the invention. The invention additionally relates to the use of polyethyleneimine (PEI) for improving the impregnation of the first fiber material (F1) with the polyamide matrix polymer (PAM).

14 Claims, No Drawings

(56) References Cited

U.S. PATENT DOCUMENTS

| | | |
|---|---|---|
| 2013/0190454 A1 | 7/2013 | Desbois et al. |
| 2013/0221555 A1 | 8/2013 | Radtke et al. |
| 2013/0320588 A1 | 12/2013 | Habraken et al. |
| 2014/0008018 A1* | 1/2014 | Di Martino ........... B29C 70/465 156/306.6 |
| 2014/0252265 A1 | 9/2014 | Gabriel et al. |
| 2014/0323631 A1 | 10/2014 | Gabriel et al. |

FOREIGN PATENT DOCUMENTS

| | | |
|---|---|---|
| DE | 19931720 A1 | 1/2001 |
| DE | 102010062538 A1 | 6/2011 |
| EP | 25515 A1 | 3/1981 |
| EP | 129195 A2 | 12/1984 |
| EP | 129196 A2 | 12/1984 |
| EP | 675914 A1 | 10/1995 |
| EP | 895521 A1 | 2/1999 |
| EP | 1120443 A2 | 8/2001 |
| WO | WO-94/12560 A1 | 6/1994 |
| WO | WO-9414873 A1 | 7/1994 |
| WO | WO-9740088 A1 | 10/1997 |
| WO | WO-2010076145 A1 | 7/2010 |
| WO | WO-2012058345 A1 | 5/2012 |
| WO | WO-2015024879 A1 | 2/2015 |
| WO | WO-2015024911 A1 | 2/2015 |
| WO | WO-2015024913 A1 | 2/2015 |
| WO | WO-2015140016 A1 | 9/2015 |

OTHER PUBLICATIONS

International Search Report for PCT/EP2014/067589 dated Sep. 29, 2014.

Steuerle et al., "Aziridines", Ullmann's Ullmann Encyclopedia of Industrial Chemistry(Electronic Release), vol. 4, pp. 515-522 (2012).

International Preliminary Report on Patentability for PCT/EP2014/067589 dated Feb. 23, 2016.

English Translation of Chinese Office Action for Chinese Application No. 201480057715.9, dated Nov. 1, 2017.

* cited by examiner

METHOD FOR PRODUCING A COMPOSITE PLASTIC PART (CK)

CROSS-REFERENCE TO RELATED APPLICATIONS

This application is a national stage application (under 35 U.S.C. § 371) of PCT/EP2014/067589, filed Aug. 18, 2014, which claims benefit of European Application No. 13181152.3, filed Aug. 21, 2013, both of which are incorporated herein by reference in their entirety.

The present invention relates to a process for producing a plastic composite component (CC) in which a first fiber material (F1) is impregnated with a polyamide matrix polymer (PAM) to obtain a matrix composition (MC), to which a surface composition (SC) is applied, and a first plastic component (C1) is obtained. In a second step, a second plastic component (C2) is molded onto the first plastic component (C1), giving the plastic composite component (CC). The invention further relates to the plastic composite component (CC) obtainable by the process of the invention. The present invention further provides for the use of polyethyleneimine (PEI) for improving the impregnation of the first fiber material (F1) with the polyamide matrix polymer (PAM).

Fiber-reinforced plastics have become established over many years as materials which are used as a substitute for metal parts in many fields of use. Fiber-reinforced plastic panels are therefore also referred to as organosheets. The use of fiber-reinforced plastics is intended to reduce the weight of the materials used and the production costs for materials. In fiber-reinforced plastic components, it is customary for a glass fiber, carbon fiber or aramid fiber in the form of a laid scrim or a woven fabric to be surrounded by a polymer. The fiber-reinforced plastic parts thus obtained are producible inexpensively, are light compared to comparable metal parts and are notable for good mechanical properties.

For the first fiber-reinforced plastic parts, thermoset polymers were used as polymer components. In order to achieve greater freedom of configuration with regard to the processing and further processing and to the shapes producible with fiber-reinforced plastics, fiber-reinforced plastics comprising thermoplastics as polymer component have been developed.

In order to further increase freedom of configuration and construction options, fiber-reinforced plastics can be processed further by welding and insert molding. The welding and insert molding of continuous fiber-reinforced flat plastic parts is described, for example, in Marco Wacker et. al., "SchweiBen und Umspritzen von Organoblechen" [Welding and Insert Molding of Organosheets], KU-Kunststoffe, Karl Hanser Verlag Munich, volume 92 (2002), 6. By means of the processes for in-mold coating and insert molding described therein, it is possible to mount functional elements onto the fiber-reinforced flat plastic parts. For this purpose, the fiber-reinforced flat plastic is preheated before being inserted into the mold and then insert-molded with a second polymer.

In order to achieve a good bond between the first plastic part and the second polymer which is injected into the mold, it is necessary, as described above, to preheat the first plastic element. For the preheating, it is possible to use, for example, infrared sources or ovens. The preheating softens the first plastic element and may partly melt it at the surface. The heating can also be effected outside the mold. It is also possible to conduct the heating directly within the mold. In this way, deformation of the softened first plastic element can be avoided.

In order to achieve sufficiently high bond strength (adhesion) between the first plastic element and the second plastic element, sufficiently deep partial melting of the surface of the first plastic element is necessary to give rise to a stable weld bond. Because of the preferred heating of the first plastic element in the mold, a high cycle time is required for the finished molding to be removed from the mold, since removal is generally not possible until the polymer of the first plastic element and the polymers which are injected into the molding as a component of the second plastic element have solidified to such an extent that the molding is dimensionally stable. For this purpose, the mold is typically cooled prior to the removal of the finished molding.

The prior art describes various methods for achieving sufficient adhesion between the first and second plastic elements and hence good stability of the resulting plastic composite component (CC).

US 2008/0176090 A1 describes a plastic composite component comprising a first and a second plastic component. The adhesion is improved by using what is called an adhesion promoter layer between the first and second plastic components. The adhesion promoter layer comprises ethylene-vinyl alcohol copolymers, ethylene-vinyl acetate copolymers or ionomers, for example ethylene-based polymers which have carboxylic groups and in which the carboxylic groups have been neutralized with metal ions. The plastic composite components described in US 2008/0176090 already have good adhesion, but the production thereof is complex because of the need for an additional adhesion promoter layer.

US 2012/0027983 describes polyamide composite components where the use of a separate adhesion promoter layer is not absolutely necessary. The plastic composite components likewise have a first and a second plastic component, at least one of the plastic components containing 1% to 15% by weight of a functionalized polyolefin for improving the adhesion between the first and second plastic components.

Functionalized polyolefins used are, for example, polyolefins grafted with maleic anhydride.

In plastic composite components, the first plastic element used is frequently a fiber-reinforced plastic element. For this purpose, for example, a fiber mat is impregnated with a plastic. For impregnation, the plastic is melted, in order to very substantially surround the fiber mat. In order to achieve good stability of the plastic composite component, it is necessary here that the fiber mat is fully penetrated by the plastic. The individual fibers in the fiber mat should be ensheathed very substantially by the molten plastic. In the processes described in the prior art, it is necessary for this purpose to heat the plastic to high temperatures in order that the plastic melt attains a sufficiently low viscosity to assure complete ensheathing of the fiber mat.

Complete ensheathing of the fiber mat with plastic is necessary to assure good stability of the plastic composite component after the second plastic element has been molded on.

The high temperatures described in the prior art for impregnation of the fiber mat are disadvantageous since the high temperatures result in thermal stress on the plastic melt. This can lead to degradation of the polymer chains in the plastic melt. Furthermore, complete ensheathing of the individual fibers of the fiber mat is not always reliably assured in the processes described in the prior art.

It is thus an object of the present invention to provide a process for producing a composite plastic component which reliably assures the complete ensheathing of the fiber materials used. The process shall additionally reliably assure complete ensheathing of the individual fibers in the fiber materials even at relatively low temperatures. In addition, the plastic composite component shall have improved or at least equivalent adhesion between the two plastic elements. The plastic composite component shall additionally be stable to thermal stresses. The plastic composite component obtainable by the process shall have improved or at least equivalent thermal aging resistance (TAR). The process shall be simple and inexpensive to perform. The plastic composite component obtainable by the process shall have good mechanical properties. Especially good adhesion between the first and second plastic components, and improved thermal aging resistance (TAR).

The object is achieved by a process for producing a plastic composite component (CC), comprising the following steps:
a) producing a first plastic component (C1), comprising the following steps:
 ia) impregnating a first fiber material (F1) with a polyamide matrix polymer (PAM) to obtain a matrix composition (MC) and
 ib) applying a surface composition (SC) comprising a polyamide surface polymer (PAS) to the matrix composition (MC) to obtain the first plastic component (C1), the surface composition (SC) forming a surface of the first plastic component (C1),
b) molding a second plastic component (C2) comprising a polyamide molding polymer (PAA) onto the surface of (C1),
where
the matrix composition (MC) comprises a polyethyleneimine (PEI).

It has been found that, surprisingly, the process according to the invention reliably assures complete ensheathing of the first fiber material (F1) by impregnation. The impregnation can be performed in the process according to the invention at comparatively low temperatures. The plastic composite component (CC) produced by the process of the invention has improved adhesion between the first plastic component (C1) and the second plastic component (C2). The plastic composite component (CC) obtainable by the process of the invention thus has good mechanical properties, especially very good adhesion between the first plastic component (C1) and the second plastic component (C2). The plastic composite components (CC) are producible less expensively by the process of the invention, since lower temperatures have to be expended for the production. Furthermore, the plastic composite component (CC) obtainable by the process of the invention exhibits improved thermal aging stability (TAS) as compared with plastic composite components which are produced by the processes described in the prior art.

The details and preferences which follow with regard to the process for producing a plastic composite component (CC) apply correspondingly to the plastic composite component (CC) and to the use of polyethyleneimine (PEI) for improving the impregnation of the first fiber material (F1) in the production of a plastic composite component (CC).

First Plastic Component (C1),

The first plastic component (C1) is also referred to hereinafter as C1 for short. The matrix composition (MC) is also referred to hereinafter as MC for short. The polyamide matrix polymer (PAM) is also referred to hereinafter as PAM for short. The first fiber material (F1) is also referred to hereinafter as F1 for short. The surface composition (SC) is also referred to hereinafter as SC for short. The polyamide surface polymer (PAS) is also referred to hereinafter as PAS for short.

Matrix Composition (MC)

The matrix composition (MC) comprises a polyamide matrix polymer (PAM) and at least one first fiber material (F1) for reinforcement. In the present context, the term "a polyamide matrix polymer (PAM)" is understood to mean either exactly one polyamide matrix polymer (PAM) or mixtures of two or more polyamide matrix polymers (PAM). The same applies to the term "at least one first fiber material (F1)". According to the invention, this is understood to mean either exactly one first fiber material (F1) or mixtures of two or more fiber materials (F1).

Polyamide Matrix Polymer (PAM)

The polyamide matrix polymer (PAM) used may, as explained above, be exactly one polyamide matrix polymer (PAM). It is also possible to use mixtures of two or more polyamide matrix polymers (PAM). Suitable polyamide matrix polymers (PAM) generally have a viscosity number of 90 to 350 mL/g, preferably of 110 to 240 mL/g. The viscosity number is determined from a 0.5% by weight solution of a polyamide matrix polymer (PAM) in 96% by weight sulfuric acid at 25° C. to ISO 307.

Preferred polyamide matrix polymers (PAM) are semicrystalline or amorphous polyamides. Suitable polyamide matrix polymers (PAM) have a weight-average molecular weight ($M_W$) in the range of from 500 to 2 000 000 g/mol. The average molecular weight ($M_w$) is determined by means of light scattering to ASTM D4001.

Suitable polyamide matrix polymers (PAM) are, for example, polyamides which derive from lactams having 7 to 13 ring members. Further suitable polyamide matrix polymers (PAM) are polyamides which are obtained by reaction of dicarboxylic acids with diamines.

Examples of polyamides which derive from lactams include those which derive from polycaprolactam, polycaprylolactam and/or polylaurolactam.

If polyamides obtainable from dicarboxylic acids and diamines are used, dicarboxylic acid alkanes used may be dicarboxylic acids having 6 to 36 carbon atoms, preferably 6 to 12 carbon atoms. Additionally suitable are aromatic dicarboxylic acids.

Examples of dicarboxylic acids include adipic acid, azelaic acid, sebacic acid, dodecanedicarboxylic acid and terephthalic acid and/or isophthalic acid.

Examples of suitable diamines are alkanediamines having 4 to 36 carbon atoms, especially alkanediamines having 6 to 12 carbon atoms, and aromatic diamines, for example m-xylylenediamine, di(4-aminophenyl)methane, di(4-aminocyclohexyl)methane, 2,2-di(4-aminophenyl)propane, 2,2-di(4-aminocyclohexyl)propane or 1,5-diamino-2-methylpentane.

Preferred polyamide matrix polymers (PAM) are polyhexamethyleneadipamide, polyhexamethylenesebacamide, polycaprolactam and nylon-6/6,6 copolyamide, especially having a proportion of 5% to 95% by weight of caprolactam units.

Further suitable PAMs are polyamides obtainable by copolymerizing two or more of the monomers mentioned above and below, and mixtures of two or more polyamides in any desired mixing ratio. Particular preference is given to mixtures of nylon-6,6 with other polyamides, especially nylon-6/6,6 copolyamide.

Further particularly advantageous PAMs have been found to be semiaromatic copolyamides such as PA 6/6T and PA 66/6T having a triamine content of less than 0.5% by weight and preferably less than 0.3% by weight.

Such semiaromatic copolyamides having a low triamine content can be prepared, for example, by the processes described in EP A 129 195 and 129 196.

The non-comprehensive list which follows comprises the aforementioned polyamides and further polyamides which are suitable as PAMs, and the monomers present.

AB Polymers:

| PA 4 | pyrrolidone |
|---|---|
| PA 6 | ε-caprolactam |
| PA 7 | ethanolactam |
| PA 8 | caprylolactam |
| PA 9 | 9-aminopelargonic acid |
| PA 11 | 11-aminoundecanoic acid |
| PA 12 | laurolactam |

AA/BB Polymers:

| PA 46 | tetramethylenediamine, adipic acid |
|---|---|
| PA 66 | hexamethylenediamine, adipic acid |
| PA 69 | hexamethylenediamine, azelaic acid |
| PA 610 | hexamethylenediamine. sebacic acid |
| PA 612 | hexamethylenediamine, decanedicarboxylic acid |
| PA 613 | hexamethylenediamine, undecanedicarboxylic acid |
| PA 1212 | dodecane-1,12-diamine, decanedicarboxylic acid |
| PA 1313 | tridecane-1,13-diamine, undecanedicarboxylic acid |
| PA 6T | hexamethylenediamine, terephthalic acid |
| PA MXD6 | m-xylylenediamine, adipic acid |
| PA 6I | hexamethylenediamine, isophthalic acid |
| PA 6-3-T | trimethylhexamethylenediamine, terephthalic acid |
| PA 6/6T | (see PA 6 and PA 6T) |
| PA 6/66 | (see PA 6 and PA 66) |
| PA 6/12 | (see PA 6 and PA 12) |
| PA 66/6/610 | (see PA 66, PA 6 and PA 610) |
| PA 6I/6T | (see PA 6I and PA 6T) |
| PA PACM 12 | diaminodicyclohexylmethane, laurolactam |
| PA 6I/6T/PACM | as PA 6I/6T + diaminodicyclohexylmethane |
| PA 12/MACMI | laurolactam, dimethyldiaminodicyclohexylmethane, isophthalic acid |
| PA 12/MACMT | laurolactam, dimethyldiaminodicyclohexylmethane, terephthalic acid |
| PA PDA-T | phenylenediamine, terephthalic acid |

The present invention thus also provides a plastic composite component (CC) in which the polyamide matrix polymer (PAM) is at least one polyamide selected from the group consisting of PA 4, PA 6, PA 7, PA 8, PA 9, PA 11, PA 12, PA 46, PA 66, PA 69, PA 610, PA 612, PA 613, PA 1212, PA 1313, PA 6T, PA MXD6, PA 6I, PA 6-3-T, PA 6/6T, PA 6/66, PA 6/12, PA 66/6/610, PA 6I/6T, PA PACM 12, PA 6I/6T/PACM, PA 12/MACMI, PA 12/MACMT, PA PDA-T and copolyamides composed of two or more of the aforementioned polyamides.

Preferably, the polyamide matrix polymer (PAM) is a polyamide selected from the group consisting of nylon-6, nylon-6,6 and copolyamides of nylon-6 and nylon-6,6.

Preferably, the polyamide matrix polymer (PAM) is nylon-6.

In a further preferred embodiment, the polyamide matrix polymer (PAM) is nylon-6,6.

In a further preferred embodiment, the polyamide matrix polymer (PAM) is nylon-6/6,6.

The PAM may further comprise further customary additives, for example impact modifiers, lubricants. UV stabilizers and process stabilizers.

First Fiber Material (F1)

Examples of suitable materials for the first fiber material (F1) include carbon fibers, glass fibers, aramid fibers, potassium titanate fibers, boron fibers, mineral fibers (for example basalt fibers) and metallic fibers (for example steel fibers or copper fibers).

A preferred first fiber material (F1) is a continuous fiber material.

The present invention thus also provides a process in which the first fiber material (F1) is a continuous fiber material.

The terms "continuous fiber material" and "continuous fiber" are used synonymously hereinafter. In the present context, a continuous fiber is understood to mean a linear structure according to DIN 60 000 of virtually unlimited length, which can be subjected to textile processing. A continuous fiber is also referred to as filament. The term "filament" is used in the textile industry. A filament (continuous fiber) is accordingly understood to mean a virtually endless fiber produced by a chemical or industrial route according to DIN 60 001 T 2 (December 1974).

If a continuous fiber material is used as first fiber material (F1), preference is given to continuous glass fibers. The continuous fibers may be used in the form of a loop-drawn knitted fabric, a loop-formed knitted fabric or a woven fabric. It is also possible to use unidirectional continuous fibers. Such single-thread continuous fibers are also referred to as monofils. If unidirectional continuous fibers are used, a multitude of continuous glass fibers used in parallel to one another is used. In this case, preference is given to using unidirectional layers of continuous fibers aligned parallel to one another.

Furthermore, it is possible to use bidirectional or multidirectional layers of continuous fibers. In this case, the first fiber material (F1) has an elemental unidirectional layer (UD layer). Above and/or below the elemental UD layer is disposed a further UD layer in which the direction of the continuous fibers is rotated by, for example, 90° relative to the fiber direction of the elemental UD layer. In the case of multidirectional layers, the first fiber material (F1) comprises a plurality of layers (for example three, four, five or six layers) in which the directions of the fibers in the particular layers are each rotated by 90°, for example, relative to one another. The angle with which the individual unidirectional layers are rotated relative to one another in bi- or multidirectional layers may vary within wide ranges, for example in the range from ±10° to ±90°.

If the first fiber material (F1) used is the preferred continuous fibers, the continuous fibers may each be used individually. It is also possible to weave the continuous fibers individually in each case or to weave individual continuous fiber bundles with one another. The continuous fibers may additionally be used in the form of a nonwoven or a felt. Suitable continuous fiber materials are known to those skilled in the art. Particularly preferred continuous fiber materials are glass fibers and carbon fibers. Especially preferred are continuous glass fibers and continuous carbon fibers having a fiber diameter in the range from 9 to 34 μm.

The matrix composition (MC) may, as well as the polyamide matrix polymer (PAM) and the first fiber material (F1), comprise further customary additives. Suitable additives are, for example, UV stabilizers, lubricants, nucleating agents, dyes, plasticizers. Suitable further additives are described, for example, in WO 2010/076145.

The surface composition (SC) and the second plastic component (C2) may also comprise further customary additives as described, for example, in WO 2010/076145.

The further additives are generally present in the matrix composition (MC) in amounts of 0% to 5% by weight, based on the total weight of the polyamide matrix material (PAM), or based on the total weight of the polyamide surface polymer (PAS) in the surface composition (SC) or based on the total weight of the polyamide molding polymer (PAA) of the second plastic component (C2).

The matrix composition (MC) generally comprises 0.01% to 5% by weight of polyethyleneimine (PEI), based on the total weight of the matrix composition (MC).

The surface composition (SC) and the second plastic component (C2) may likewise comprise a polyethyleneimine (PEI).

The present invention thus also provides a plastic composite component (CC) comprising a polyethyleneimine (PEI) in the surface composition (SC), in the matrix composition (MC) and in the second plastic component (C2).

In a further embodiment, SC, MC and C2 comprise the same polyethyleneimine (PEI).

In order to facilitate the impregnation of the first fiber material (F1) in process step ia) and to reliably assure complete ensheathing of the fibers even at comparatively low temperatures, however, it is sufficient when only the matrix composition (MC) comprises a polyethyleneimine (PEI).

The present invention thus also provides a plastic composite component (CC) comprising a polyethyleneimine (PEI) only in the matrix composition (MC).

The matrix composition (MC) generally comprises
10% to 99.94% by weight of a polyamide matrix polymer (PAM),
0.01% to <2% by weight of a polyethyleneimine (PEI),
0.01% to 80% by weight of a first fiber material (F1) and
0% to 5% by weight of further additives,
where the percentages by weight are each based on the total weight of MC.

Surface Composition (SC)

The surface composition (SC) comprises a polyamide surface polymer (PAS) and forms a surface of the first plastic component (C1). In the present context, the term "a surface" is understood to mean either exactly one surface or two or more surfaces. In the present context, the term "a polyamide surface polymer (PAS)" is understood to mean either exactly one PAS or mixtures of two or more PASs.

The surface composition (SC) may form the surface of the plastic component (C1) locally at a defined position. It is also possible that the surface composition (SC) completely surrounds the matrix composition (MC). In the preferred case of a flat plastic composite component (CC), the surface composition (SC) may form one surface on the top side of the matrix composition (MC) and/or on the bottom side of the matrix composition (MC).

If the surface composition (SC) forms a surface only on the top side or only on the bottom side of the matrix composition (MC), the surface composition (SC) forms 10% to 50% of the total surface area of the first plastic component (C1), preferably 30% to 50% and more preferably 40% to 50% of the total surface area of the first plastic component (C1).

If the surface composition (SC) forms a surface on the top side and the bottom side of the matrix composition (MC), the surface composition (SC) forms greater than 50% to 100% of the total surface area of the first plastic component (C1), preferably 80% to 100% and more preferably 90% to 100% of the total surface area of the first plastic component (C1).

Polyamide surface polymers (PAS) used may be polyamides as described above for the polyamide matrix polymer (PAM). The above details and preferences with regard to the polyamide matrix polymer (PAM) thus apply correspondingly to the polyamide surface polymer (PAS).

The polyamide surface polymer (PAS) generally does not comprise any fiber material (F1). The polyamide surface polymer (PAS) may optionally comprise further additives as described above for the polyamide matrix polymer (PAM).

In a preferred embodiment, the surface composition (SC) does not comprise any fiber material (F1).

In a preferred embodiment, the surface composition (SC) comprises, as polyamide surface polymer (PAS), the same polyamide polymer as the polyamide matrix polymer (PAM). In a preferred embodiment, polyamide matrix polymer (PAM) and the polyamide surface polymer (PAS) are thus identical.

However, it is also possible to use, as polyamide surface polymer (PAS), a polyamide polymer different than the polyamide matrix polymer (PAM).

In one embodiment, the surface composition (SC) comprises a polyethyleneimine (PEI).

Production of the First Plastic Component (C1)

Process Step ia) Impregnating the First Fiber Material (F1)

If the first fiber material (F1) used is a continuous fiber material in the form of a mat, a nonwoven, a felt, a woven fabric, a loop-drawn knitted fabric or a loop-formed knitted fabric, the first plastic component (C1) is produced by impregnating the first fiber material (F1) in process step ia), generally with the polyamide matrix polymer (PAM).

The different processes for producing the matrix composition (MC) or the first plastic component (C1) are known in principle to those skilled in the art and are described, for example, in R. Stolze, Kunststoffe 78, 1988, pages 126 to 131, and in M. Wacker, G. W. Ehrenstein, C. Obermann, Kunststoffe 92, 2002, pages 78 to 81.

For production of the matrix composition (MC), in process step ia), the first fiber material (F1) is impregnated with the polyamide matrix polymer (PAM). This can be effected, for example, by contacting the polyamide matrix polymer (PAM) in the form of a melt with the first fiber material (F1). A further means of producing the matrix composition (MC) is the powder impregnation or lamination of the first fiber material (F1) with films of the polyamide matrix polymer (PAM), followed by melting and pressing of the film(s) or of the powder applied, in order to produce the matrix composition (MC).

It is also possible to ensheath individual continuous fibers or yarns of continuous fibers with the polyamide matrix polymer (PAM), then to weave the ensheathed continuous fibers and then to heat the woven fabric in order to melt the polyamide matrix polymer (PAM) and to obtain the matrix composition (MC).

According to the invention, it is crucial that the matrix composition (MC) comprises a polyethyleneimine (PEI) in order to facilitate the impregnation of the first fiber material (F1) and, even at comparatively low temperatures, to assure the complete ensheathing of the fibers of the first fiber material (F1).

The polyethyleneimine (PEI) may be applied to the first fiber material (F1) by scattering, for example as powder. The polyethyleneimine (PEI) is preferably added to the polyamide matrix polymer (PAM). For this purpose, customary mixing apparatuses, for example extruders, are used. It is also possible to add the polyethyleneimine (PEI) to the polyamide matrix polymer (PAM) only in the course of production of the matrix composition (MC).

For impregnation of the first fiber material (F1) in process step ia), the polyamide matrix polymer (PAM) is generally heated in order to lower the viscosity of the polyamide matrix polymer (PAM) to such an extent that complete ensheathing of the fibers of the first fiber material (F1) is reliably assured. In general, the polyamide matrix polymer (PAM) is pressed here together with the first fiber material (F1).

The use of a polyethyleneimine (PEI) in the matrix composition (MC) lowers the viscosity of the polyamide matrix polymer (PAM). This makes it possible, in the course of heating of the polyamide matrix polymer (PAM), to lower the viscosity even at lower temperatures, as compared with the prior art, to such an extent that complete ensheathing of the fibers of the first fiber material (F1) is reliably assured.

Use of polyethyleneimine (PEI) thus assures lowering (reduction) of the viscosity of the polyamide matrix polymer (PAM). The zero shear rate viscosity of the polyamide matrix polymer (PAM) is lowered through the use of polyethyleneimine (PEI) by at least 10%, preferably at least 50%, based on the viscosity of the polyamide matrix polymer (PAM) without polyethyleneimine (PEI).

A characteristic parameter employed for the zero shear rate viscosity for this purpose is the viscosity number as described above for the polyamide matrix polymer (PAM). The lowering of the zero shear rate viscosity is generally in the range from 10% to 50%, preferably in the range from 20% to 40%, based on the viscosity of the polyamide matrix polymer (PAM) without polyethyleneimine (PEI).

The present invention thus also further provides the plastic composite component (CC) obtainable by the process of the invention.

The present invention thus also further provides for the use of polyethyleneimine (PEI) for improving the impregnation of a first fiber material (F1) with a polyamide matrix polymer (PAM) in a process for producing a plastic composite component (CC), comprising the following steps:
a) producing a first plastic component (C1), comprising the following steps:
  ia) impregnating a first fiber material (F1) with a polyamide matrix polymer (PAM) to obtain a matrix composition (MC) and
  ib) applying a surface composition (SC) comprising a polyamide surface polymer (PAS) to the matrix composition (MC) to obtain the first plastic component (C1), the surface composition (SC) forming a surface of the first plastic component (C1),
b) molding a second plastic component (C2) comprising a polyamide molding polymer (PAA) onto the surface of (C1),
wherein
  the matrix composition (MC) comprises a polyethyleneimine (PEI), In general, the polyamide matrix polymer (PAM) is heated in process step ia) to temperatures in the range from 100 to 360° C., preferably in the range from 150 to 310° C., more preferably to 180 to 300° C. and especially in the range from 190 to 290° C.

The present invention also provides a process in which the polyamide matrix polymer (PAM) is heated in process step ia) to temperatures in the range from 40° C. to 210° C.

Process Step ib) Applying the Surface Composition (SC)

In process step ib), the surface composition (SC) is applied to the matrix composition (MC). This affords the plastic component (C1), with the surface composition (SC) forming a surface of the first plastic component (C1).

The surface composition (SC) can likewise be applied here to the matrix composition by processes known to those skilled in the art. It is possible to scatter the surface composition (SC) as powder onto the matrix composition (MC) and then to heat it, generally under pressure. Preferably, the surface composition (SC) is laminated onto the matrix composition (MC) in the form of a film.

In general, the surface composition (SC) is heated in process step ib) to temperatures in the range from 100 to 360° C., preferably in the range from 150 to 310° C., more preferably to 180 to 300° C. and especially in the range from 190 to 290° C.

The present invention also provides a process in which the surface composition (SC) is heated in process step ib) to temperatures in the range from 40° C. to 210° C.

In a preferred embodiment, in process step a), process steps ia) and ib) are conducted simultaneously, such that the first plastic component (C1) is obtained directly.

The present invention thus also provides a process wherein process steps ia) and ib) are conducted simultaneously in process step a).

In one embodiment, the plastic component (C1) has a layered structure. This structure is also referred to as sandwich structure. In the case of a sandwich structure, the plastic component (C1) has a multitude of layers of the first fiber material (F1). A multitude is understood in the present context generally to mean 2 to 20 layers of the first fiber material (F1). In the sandwich structure, in a formal sense, there is at least one polymer layer between any two adjacent layers of the first fiber material (F1). These polymer layers are formed from the polyamide matrix polymer (PAM).

The general details and preferences in relation to C1, F1, PAM and PAS apply correspondingly to this embodiment. In the case of a sandwich structure, it may comprise 1 to 20, preferably 2 to 10 and more preferably 2 to 6 layers of the first fiber material (F1).

The production of such a sandwich structure is known per se to those skilled in the art and can be effected, for example, by laminating. The production is described hereinafter using the example of a sandwich structure having two layers of the first fiber material (F1). For this purpose, the materials are applied to one another in the sequence specified and then joined together, preferably under pressure while heating: a film of PAS, a layer of F1, a film of PAM, a layer of F1 and a film of PAS.

The joining can be effected, for example, with heating under pressure. For this purpose, the aforementioned materials can be fed, for example, to a heatable roller press in which the joining is effected.

The heating in the joining operation results in melting of the polyamide matrix polymer (PAM) used as middle layer. As a result, the adjacent layers of the first fiber material (F1) are impregnated by the polyamide matrix polymer (PAM). The above-described illustrative process affords, as plastic component (C1), a sandwich structure having the following layer structure:

PAS, F1, PAM, F1 and PAS.

In the course of heating and pressing, there is formation in the formal sense of the matrix composition (MC) from the polyamide matrix polymer (PAM) film and the two layers of the first fiber material (F1).

The sandwich structure obtained as first plastic component (C1) thus has, in a formal sense, the following layer structure: PAS, F1, PAM, F1 and PAS. The matrix composition (MC) forms here in a formal sense from F1, PAM and F1. The matrix composition thus consists of fiber material (F1) impregnated on both sides with the polyamide matrix polymer (PAM) in between. Depending on the degree of heating and the pressure expended, the two mats of the first fiber material (F1) in the first plastic component (C1) may be in contact.

If further additives are used, these are generally likewise distributed in the respective polyamide polymer by suitable mixing apparatuses.

The second plastic component (C2) may likewise comprise a polyethyleneimine (PEI).

The matrix composition (MC) generally comprises 0.01% to 5% by weight of polyethyleneimine (PEI), based on the total weight of the matrix composition (MC). The matrix composition (MC) preferably comprises 0.1% to 1% by weight of polyethyleneimine (PEI), based on the total weight of the matrix composition (MC).

The present invention thus also provides a process in which the matrix composition (MC) comprises 0.01% to 5% by weight of polyethyleneimine (PEI), based on the total weight of the matrix composition (MC).

In a further embodiment, the plastic composite component (CC) generally comprises 0.01% to 5% by weight of a polyethyleneimine (PEI), based on the total weight of the plastic composite component (CC). The plastic composite component (CC) preferably comprises 0.1% to 1% by weight of polyethyleneimine (PEI), based on the total weight of the plastic composite component (CC).

Polyethyleneimine (PEI)

Polyethyleneimines (PEIs) are understood in the context of the present invention to mean both homo- and copolymers obtainable, for example, by the processes in Ullmann (Electronic Release) under the heading "Aziridines" or according to WO-A 94/12560.

The homopolymers are generally obtainable by polymerizing ethyleneimine (aziridine) in aqueous or organic solution in the presence of acid-eliminating compounds acids or Lewis acids. Homopolymers of this kind are branched polymers generally comprising primary, secondary and tertiary amino groups in a ratio of about 30% to 40% to 30%. The distribution of the amino groups can generally be determined by means of $^{13}C$ NMR spectroscopy. The latter is preferably 1:0.8:0.5 to 1:1.3:8, especially 1:1.1:0.8 to 1:1.

The present invention thus also provides a process in which the polyethyleneimine (PEI) comprises primary, secondary and tertiary amino groups, where the ratio of primary to secondary to tertiary amino groups is in the range from 1:0.8:0.5 to 1:1.3:0.8.

Comonomers used are preferably compounds having at least two amino functions. Suitable comonomers include, for example, alkylenediamines having 2 to 10 carbon atoms in the alkylene radical, preference being given to ethylenediamine and propylenediamine. Further suitable comonomers are diethylenetriamine, triethylenetetramine, tetraethylenepentamine, dipropylenetriamine, tripropylenetriamine, dihexamethylenetriamine, aminopropylethylenediamine and bisaminopropylethylenediamine.

Polyethyleneimines (PEIs) typically have a weight-average molecular weight $M_w$ of 600 to 3 000 000, preferably 700 to 2 000 000. The preferred $M_w$ is 800 to 50 000, especially from 1100 to 25 000. The weight-average molecular weight is determined by means of light scattering to ASTM D4001.

The present invention thus also provides a process in which the polyethyleneimine (PEI) has a weight-average molecular weight $M_W$ in the range from 600 to 300 000 g/mol.

Additionally suitable are crosslinked polyethyleneimines (PEIs) obtainable by reaction of polyethyleneimines (PEIs) with bi- or polyfunctional crosslinkers having, as functional group, at least one halohydrin, glycidyl, aziridine or isocyanate unit or a halogen atom. Examples include epichlorohydrin or bichlorohydrin ethers of polyalkylene glycols having 2 to 100 ethylene oxide and/or propylene oxide units, and the compounds detailed in DE-A 19 93 17 20 and U.S. Pat. No. 4,144,123. Processes for preparing crosslinked polyethyleneimines (PEIs) are known inter alia from the abovementioned specifications, and also EP-A895 521 and EP-A 25 515.

Additionally suitable are grafted polyethyleneimines (PEIs), where grafting agents used may be all compounds which can react with the amino or imino groups of the polyethyleneimines (PEIs). Suitable grafting agents and processes for preparing grafted polyethyleneimines (PEIs) can be found, for example, in EP-A 675 914.

Likewise suitable polyethyleneimines (PEIs) in the context of the invention are amidated polymers typically obtainable by reaction of polyethyleneimines (PEIs) with carboxylic acids, esters or anhydrides thereof, carboxamides or carbonyl halides. According to the proportion of amidated nitrogen atoms in the polyethyleneimine chain, the amidated polymers may subsequently be crosslinked with the crosslinkers mentioned. Preferably, it is possible here for up to 30% of the amino functions to be amidated, in order that sufficient primary and/or secondary nitrogen atoms are available for a subsequent crosslinking reaction.

Also suitable are alkoxylated polyethyleneimines (PEIs) obtainable, for example, by reaction of polyethyleneimine (PEI) with ethylene oxide and/or propylene oxide. Alkoxylated polymers of this kind are subsequently crosslinkable as well.

Further suitable polyethyleneimines (PEIs) of the invention include hydroxyl-containing polyethyleneimines (PEIs) and amphoteric polyethyleneimines (PEIs) (incorporation of anionic groups), as are lipophilic polyethyleneimines (PEIs) which are generally obtained by incorporation of long-chain hydrocarbyl radicals into the polymer chain. Processes for producing polyethyleneimines (PEIs) of this kind are known to those skilled in the art.

Preferred polyethyleneimines (PEIs) are hyperbranched polyethyleneimines (PEIs). The term "hyperbranched" in the context of the present invention means that the degree of branching (DB) of the polyethyleneimine (PEI) is in the range from 10% to 99%, preferably in the range from 50% to 99% and more preferably in the range from 60% to 99%. DB is defined as $$DB(\%)=100\times(T+Z)/(T+Z+L)$$

where T is the mean number of terminal-bonded monomer units, Z is the mean number of monomer units that form branches and L is the mean number of linear-bonded monomer units in the polyethyleneimine (PEI).

The present invention thus also provides a plastic composite component (CC), wherein the polyethyleneimine (PEI) is a hyperbranched polymer having a degree of branching DB in the range from 10% to 99%, where DB is defined as DB (%)=100×(T+Z)/(T+Z+L) where T is the mean number of terminal-bonded monomer units, Z is the mean number of monomer units that form branches and L is the mean number of linear-bonded monomer units in the polyethyleneimine (PEI).

Second Plastic Component (C2)

The second plastic component (C2) comprises a polyamide molding polymer (PAA). In the present context, the term "a polyamide molding polymer (PAA)" is understood to mean either exactly one PAA or mixtures of two or more PAAs. Polyamide molding polymers (PAAs) used may generally be polyamides which can also be used as polyamide matrix polymer (PAM). The details relating to the polyamide matrix polymer (PAM) and the preferences mentioned in that context thus apply correspondingly to the polyamide molding polymer (PAA).

The polyamide molding polymer (PAA) used may be the same polyamide as for the polyamide matrix polymer (PAM). It is also possible to use a polyamide different than the polyamide matrix polymer (PAM) for the polyamide molding polymer (PAA).

The polyamide molding polymer (PAA) may also comprise further customary additives as described above for PAS and PAM.

The polyamide molding polymer (PAA) may likewise comprise a polyethyleneimine (PEI).

C2 may comprise the same polyethyleneimine (PEI) as the SC. It is also possible that C2 comprises a polyethyleneimine (PEI) different than SC. The details and preferences for the polyethyleneimine (PEI) as given above for the surface composition (SC) apply correspondingly to C2.

The polyethyleneimine (PEI) is preferably likewise mixed into the polyamide molding polymer (PAA). For this purpose, it is possible to use known mixing apparatuses, for example extruders. Preferably, the second plastic component (C2) likewise comprises a fiber material for reinforcement.

The present invention thus also provides a process in which C2 comprises a second fiber material (F2).

Suitable materials for this second fiber material (F2) include, merely by way of example, carbon fibers, glass fibers, aramid fibers, potassium titanate fibers, boron fibers, mineral fibers (for example basalt fibers) and metallic fibers (for example steel fibers or copper fibers).

Continuous fibers are unsuitable as second fiber material (F2). Preferred second fiber materials (F2) are glass fibers (short glass fibers). These glass fibers may be mixed into a polyamide melt, for example, with an extruder.

The present invention thus also provides a process in which the second fiber material (F2) is a short fiber material.

Second fiber materials (F2) used are preferably fibers which can be mixed into the polyamide molding polymer (PAA) by means of suitable mixing apparatuses. The second plastic component (C2) may optionally comprise further additives. Further additives used may be additives mentioned above for MC or SC.

Process Step b) Molding of the Second Plastic Component (C2)

The first plastic component (C1) is generally placed into a mold. It is possible here, for example, to premold the first plastic component (C1) in an upstream step in a first mold and subsequently to place the premolding thus produced into the mold. This is possible especially when the first plastic component (C1) is a flat plastic element.

Alternatively, it is also possible to form the first plastic component (C1) directly in the mold. However, it is preferable to premold the first plastic component (C1) in a first mold and subsequently to place the premolding into the mold.

In addition, it is possible to heat the first plastic component (C1) before placing it into the mold or alternatively to heat the first plastic component (C1) in the mold. In particular, it is preferable to preheat the first plastic component (C1) and to place the preheated first plastic component (C1) into the mold.

Preferably, the mold has a temperature in the range from 40 to 210° C., especially in the range from 80 to 120° C. The first plastic component (C1) is preferably heated before being inserted into the mold to a temperature of 30 to 190° C., especially in the range from 120 to 170° C.

After inserting the first plastic component (C1), the second plastic component (C2) is introduced into the mold. In the course of this, the second plastic component (C2) is molded onto the surface of the first plastic component (C1). This molding operation is also referred to as "overmolding". In the context of present invention, "molding" is understood to mean the partial molding of the second plastic component (C2) onto parts of the first plastic component (C1). In addition, "molding" is also understood to mean the complete or partial surrounding of the first plastic component (C1) by the second plastic component (C2).

In the molding operation, the second plastic component (C2) may be molded onto the first plastic component (C1) locally at defined positions. In addition, it is also possible to surround the first plastic component (C1) completely or partly with the second plastic component (C2).

In the molding operation, it is additionally possible to form additional functional elements from the second plastic component (C2) which are molded onto the surface of the first plastic component (C1).

For molding, the second plastic component (C2) is typically melted by methods known to those skilled in the art and injected into the mold. The use of the above-described polyethyleneimine (PEI) results in achievement of improved adhesion between the first plastic component (C1) and the second plastic component (C2) in the plastic composite component (CC).

The present invention thus also provides a process in which, in step b), C1 is placed into a mold and C2 is injected into the mold in the molten state for molding.

The plastic composite component (CC) thus produced can subsequently be subjected to further processing steps. These include, for example, further forming steps and surface treatments of the plastic composite component (CC) in order to upgrade its surface.

In order to achieve a good bond between the first plastic component (C1) and the second plastic component (C2), it is advantageous when the temperature at the surface of the first plastic component (C1) is above the melting temperature of the polyamide surface polymer (PAS). For this purpose, the first plastic component (C1) is generally heated. The first plastic component (C1) can, as explained above, be heated directly in the mold. Alternatively, the first plastic component (C1) can also be heated outside the mold. The pressure with which the second plastic component (C2) is introduced into the mold depends on the flow direction of the melt of the second plastic component (C2). For this purpose, methods of injection molding and flow molding which are known per se to those skilled in the art are used and the pressures customary therein are observed.

The invention claimed is:
1. A process for producing a plastic composite component (CC), comprising the following steps:
   a) producing a first plastic component (C1) by a process comprising:
   ia) impregnating a first fiber material (F1) with a polyamide matrix polymer (PAM) to obtain a matrix composition (MC) and
   ib) applying a surface composition (SC) comprising a polyamide surface polymer (PAS) to the matrix composition (MC) to obtain the first plastic component (C1), the surface composition (SC) forming a surface of the first plastic component (C1),
   b) molding a second plastic component (C2) comprising a polyamide molding polymer (PAA) onto the surface of the first plastic component (C1), wherein
the matrix composition (MC) comprises a polyethyleneimine (PEI).

2. The process according to claim 1, wherein the polyethyleneimine (PEI) has a weight-average molecular weight $M_W$ in the range from 600 to 300 000 g/mol.

3. The process according to claim 1 wherein the polyethyleneimine (PEI) comprises primary, secondary and tertiary amino groups, where the ratio of primary to secondary to tertiary amino groups is in the range from 1:0.8:0.5 to 1:1.3:0.8.

4. The process according to claim 1, wherein the polyethyleneimine (PEI) is a hyperbranched polymer having a degree of branching DB in the range from 10% to 99%, where DB is defined as DB (%)=100×(T+Z)/(T+Z+L) where T is the mean number of terminal-bonded monomer units, Z is the mean number of monomer units that form branches and L is the mean number of linear-bonded monomer units in the polyethyleneimine (PEI).

5. The process according to claim 1, wherein the matrix composition (MC) comprises 0.01% to 5% by weight of polyethyleneimine (PEI), based on the total weight of the matrix composition (MC).

6. The process according to claim 1, wherein the first fiber material (F1) is a continuous fiber material.

7. The process according to claim 1, wherein the first plastic component (C2) comprises a second fiber material (F2).

8. The process according to claim 7, wherein the second fiber material (F2) is a short fiber material.

9. The process according to claim 1, wherein the polyamides matrix polymer (PAM) is heated in process step ia) to temperatures in the range from 40° C. to 210° C.

10. The process according to claim 1, wherein the surface composition (SC) is heated in process step ib) to temperatures in the range from 40° C. to 210° C.

11. The process according to claim 1, wherein process steps ia) and ib) are conducted simultaneously in process step a).

12. The process according to claim 1, wherein only the matrix composition (MC) comprises a polyethyleneimine (PEI).

13. A plastic composite component obtained by the process according to claim 1.

14. A method for improving the impregnation of a first fiber material (F1) with a polyamide matrix polymer (PAM) in a process for producing a plastic composite component (CC), comprising the following steps:
   a) producing a first plastic component (C1), comprising the following steps:
   ia) impregnating a first fiber material (F1) with a polyamide matrix polymer (PAM) to obtain a matrix composition (MC) and
   ib) applying a surface composition (SC) comprising a polyamide surface polymer (PAS) to the matrix composition (MC) to obtain the first plastic component (C1), the surface composition (SC) forming a surface of the first plastic component (C1),
   b) molding a second plastic component (C2) comprising a polyamide molding polymer (PAA) onto the surface of (C1);
the method comprising incorporating polyethyleneimine in the matrix composition (MC).

* * * * *